(12) United States Patent
Villar et al.

(10) Patent No.: US 12,516,889 B2
(45) Date of Patent: Jan. 6, 2026

(54) HEAT EXCHANGER WITH A CLOSING BAR OPTIMIZED FOR PROTECTION AGAINST ICING

(71) Applicant: LIEBHERR-AEROSPACE TOULOUSE SAS, Toulouse (FR)

(72) Inventors: Aymeric Villar, Toulouse (FR); Mickael Bregoli, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 207 days.

(21) Appl. No.: 18/268,217

(22) PCT Filed: Dec. 13, 2021

(86) PCT No.: PCT/EP2021/085549
§ 371 (c)(1),
(2) Date: Jun. 17, 2023

(87) PCT Pub. No.: WO2022/128952
PCT Pub. Date: Jun. 23, 2022

(65) Prior Publication Data
US 2024/0053107 A1    Feb. 15, 2024

(30) Foreign Application Priority Data
Dec. 18, 2020  (FR) ........................................ 2013641

(51) Int. Cl.
*F28D 9/00* (2006.01)
*F28F 9/02* (2006.01)

(52) U.S. Cl.
CPC .............. *F28D 9/0093* (2013.01); *F28F 9/02* (2013.01)

(58) Field of Classification Search
CPC ........ F28D 9/00; F28D 9/0062; F28D 9/0093; F28D 2021/0084; F28D 2021/0021; F28F 9/02; F28F 17/00; F28F 19/006; F28F 19/002
See application file for complete search history.

(56) References Cited

U.S. PATENT DOCUMENTS

2013/0061617 A1 * 3/2013 Borghese .................. F28F 1/04
62/402

FOREIGN PATENT DOCUMENTS

CN          206449949 U  *  8/2017

\* cited by examiner

*Primary Examiner* — Harry E Arant
(74) *Attorney, Agent, or Firm* — CRGO Global; Steven M. Greenberg (57) ABSTRACT

Heat exchanger with plates, which is configured for a heat exchange between a hot fluid and a cold fluid, comprising at least one core band (130a, 130b) arranged in order to maintain the sealing tightness, a plurality of closing bars (138) defining, with the closing plates, flow channels, characterized in that the core band (130a) arranged at a cold pass inlet and at a hot pass inlet comprises an inlet (132) for supplying hot air, and in that at least one closing bar (138) arranged in the lengthwise direction of the inlet of the cold pass comprises an inlet for said hot air and a flow circuit for said hot air in a U shape and comprising two sections, each extending over the whole length of the closing bar, a hot air outlet for expelling the hot air in the hot pass, and an intermediate section forming the base of the U.

9 Claims, 8 Drawing Sheets

HEAT EXCHANGER WITH A CLOSING BAR OPTIMIZED FOR PROTECTION AGAINST ICING

CROSS-REFERENCE TO RELATED APPLICATIONS

This application is a § 371 national phase entry of International Application No. PCT/EP2021/085549, filed Dec. 13, 2021, which claims priority to French Patent Application No. 2013641 filed on Dec. 18, 2020.

TECHNICAL FIELD OF THE INVENTION

The invention relates to a heat exchanger. In particular, the invention relates to a heat exchanger with plates and fins, which can be used in an air-conditioning system, e.g. an airborne, rail-bound or surface vehicle.

TECHNOLOGICAL BACKGROUND

Heat exchangers are used to make possible a heat transfer between at least two fluids, in particular in order to cool or heat one of the fluids by means of another fluid. Heat exchangers are used in numerous contexts, and in particular in air-conditioning systems for an airborne, rail-bound or surface vehicle, in which systems they make it possible in particular to regulate the temperature of the air conditioned by the air-conditioning system at different stages of the conditioning process.

Among the various types of heat exchangers, heat exchangers with plates and fins form a design type which use closing plates and fin chambers in order to transfer the heat between the fluids. The flow channels formed by the closing plates and the fins make it possible for each fluid to flow without mixing with the other fluids, while maximizing the surface/volume ratio for heat transfer. These types of exchangers are particularly popular in transport industries, in particular air transport, owing to their compactness and lightness, while performing well.

In an air-conditioning system, exchangers with plates and fins are particularly used in order to form an assembly of exchangers made up of an exchanger with plates and fins, referred to as a reheater, and an exchanger with plates and fins, referred to as a condenser, which are disposed in series so that they share the same hot pass. The hot pass defines the path taken by a fluid, referred to as a hot fluid, which will be cooled in passing through the exchanger by exchanging heat with a fluid, referred to as a cold fluid, passing through the exchanger via a path referred to as a cold pass.

In a conventional reheater-condenser exchanger system, two heat exchangers are disposed in series so as to cool a hot fluid. The hot passes are thus disposed in series, and in each exchanger a cold fluid cools the hot fluid.

In certain situations, the cold fluid used is at a low temperature. Thus, on entering the cold pass, the fluid may be at a temperature lower than, or close to, 0° C., which can lead to risks of icing in the heat exchanger. The presence of ice in the heat exchanger is undesirable because it can cause reductions in performance in terms of energy and pressure losses.

In order to avoid the presence of ice in the exchangers, one solution is to use bars for closing the exchangers, disposed between each closing plate and defining, with the closing plates, the flow paths of the fluids. Hot air is injected into the inside of these closing bars in order to effect de-icing and/or prevent the formation of ice. The expression "icing protection" used hereinunder in the description generally designates such a de-icing function and/or a function to prevent the formation of ice. When they implement this icing protection function, the closing bars are currently referred to as hot bars.

One problem with this solution is arranging for admission of this hot air. In particular, in a reheater-condenser-type system, arranging for the admission of hot air for the icing protection of the condenser is generally effected at the outlet of the hot pass of the condenser. Arranging for this admission is effected by welding a hot air inlet and a double wall around this inlet in order to permit the hot air to access the closing bars without mixing with the hot pass or the cold pass of the condenser. The hot air then passes through the closing bars in their lengthwise direction and is expelled in the common hot pass of the reheater-condenser system, downstream of the reheater and upstream of the condenser.

A disadvantage of this arrangement is the necessity of welding the hot air inlet and the partition, which has an adverse effect on the tolerances of the flanges for connection with the distribution housings at the exit of the hot pass of the condenser.

The inventors have sought to modify the method for admission of the hot air used for icing protection via the closing bars at the cold pass inlet.

AIMS OF THE INVENTION

The invention aims to provide a heat exchanger with optimized icing protection.

In particular, the invention aims to provide, in at least one embodiment, a heat exchanger in which the hot air supply of the closing bars does not necessitate the welding of a hot air inlet on the connection flanges and on a distribution housing.

The invention also aims to provide, in at least one embodiment of the invention, a reheater-condenser exchanger system with optimized icing protection.

DESCRIPTION OF THE INVENTION

In order to do this, the invention relates to a heat exchanger with plates, which is configured for a cross flow heat exchange between a hot fluid flowing in a hot pass and a cold fluid flowing in a cold pass, the fluids flowing between closing plates, comprising:
- at least one core band arranged to form edges of the exchanger and to ensure the sealing-tightness between the hot pass and the cold pass,
- a plurality of closing bars disposed between each closing plate and defining, with the closing plates, flow channels for fluids passing through the exchanger, characterized in that the core band arranged at an inlet of the cold pass and at an inlet of the hot pass comprises an inlet for supplying hot air, and a plurality of orifices disposed opposite at least one closing bar of the hot pass adjoining said core band, and in that at least one closing bar arranged in the lengthwise direction of the inlet of the cold pass comprises an inlet for said hot air opposite one of the orifices of the core band, and a circuit for the flow of said hot air connected to said hot air inlet, said flow circuit being U-shaped and comprising:
- a first section and a second section each extending over the whole length of the closing bar,
- a hot air outlet arranged at one end of the second section and configured to expel the hot air in the hot pass at the inlet of the hot pass, and an intermediate section forming the base of the U and connecting the first section to the second section by their end respectively opposite the hot air inlet and the hot air outlet.

An exchanger in accordance with the invention thus makes it possible to optimize the management of the icing protection function via the closing bars, in particular by using a free space at a core band at a hot pass inlet and at a cold pass inlet. The core band at the hot pass and cold pass inlet is suitable to permit the admission of the hot air and the flow of the hot air in the U-shaped hot air flow circuit in the closing bar or bars. Each closing bar, around which ice is liable to form, preferably comprises such a hot air flow circuit.

The use of the core band as a hot air inlet makes it possible to reduce the adverse effect on tolerances with respect to the welding of an inlet on the side of the outlet of the hot pass. Thus there is no modification to make at the outlet of the hot pass, in particular no intervention on the connecting flanges and on the distribution housings conventionally installed on reheater or condenser-type exchangers.

Within the scope of the use of the exchanger in an air-conditioning system, the hot fluid and the cold fluid passing through the exchanger are e.g. air (hot air and cold air respectively).

Advantageously and in accordance with the invention, at least one closing bar comprising a flow circuit is manufactured by additive manufacture.

According to this aspect of the invention, additive manufacture makes it possible to manufacture a closing bar with an integrated flow circuit more easily than with conventional machining techniques, in particular without necessitating piercing or welding. The use of additive manufacture also permits greater freedom as to the shapes used, in particular in order to maximize the heat exchange in the hot air flow circuit and thus to improve the icing protection.

Advantageously and in accordance with the invention, the core band is manufactured by additive manufacture.

According to this aspect of the invention, additive manufacture makes it possible to manufacture the core band more easily than with conventional machining techniques, in particular without necessitating piercing or welding. The use of additive manufacture also permits greater freedom as to the shapes used, in particular for improved configuration of the hot air inlet, the orifices and more generally the supply of hot air of each hot air flow circuit.

Advantageously and in accordance with the invention, at least one closing bar comprising a flow circuit and at least one portion of the core band are formed of a single-piece part.

According to this aspect of the invention, the use of a single-piece part facilitates management of the interaction between the core band and the closing bar, in particular the flow of hot air and the interaction between each orifice and the associated flow circuit. The single-piece parts are preferably manufactured by additive manufacture.

Advantageously and in accordance with the invention, the core band comprises a manifold comprising the hot air inlet, extending over the length of the core band and configured to supply hot air to each hot air flow circuit via the orifices.

According to this aspect of the invention, the manifold makes it possible to receive the hot air via an inlet and to distribute the hot air to each flow circuit.

The manifold is preferably cylindrical. In one variant of the invention, the manifold is directly integrated into the core band during manufacture thereof.

In one variant of the invention, in which a closing bar and a manifold portion are formed of a single-piece part, a portion of the manifold can be integrated into said manifold portion. By joining the single-piece parts, possibly with intermediate parts comprising portions of the core band and of the manifold without a closing bar, a complete core band is obtained comprising a manifold extending over the length of the core band so as to supply hot air to each hot air flow circuit.

The core band thus acts as a manifold of the icing protection system of the closing bars. This is thus referred to as a hot bar manifold. In the prior art, it is the double wall which acts as a manifold, as stated above.

Advantageously and in accordance with the invention, at least one hot air flow circuit comprises internal fins arranged to increase the surface area for heat exchange between the hot air and the walls of the flow circuit.

According to this aspect of the invention, the fins make it possible to maximize the heat exchange between the hot air and the walls of the circuit and thus to optimize the icing protection performance. The fins are configured to offer a good compromise between pressure losses which are acceptable in view of the whole hot air flow system and maximization of the heat exchange.

The invention also relates to a reheater-condenser exchanger system comprising at least a first exchanger, referred to as a reheater, and a second exchanger, referred to as a condenser, the reheater and the condenser being arranged in series so that a hot fluid passes through the reheater then the condenser in order to be cooled, characterized in that the condenser is a heat exchanger in accordance with the invention.

The exchanger in accordance with the invention is particularly suitable to be integrated as a condenser in a reheater-condenser exchanger system. In this context, the hot air passing through the hot air flow circuit is expelled between the reheater and the condenser downstream of the hot pass of the reheater and upstream of the hot pass of the condenser.

The invention also relates to an air-conditioning system of a vehicle, characterized in that it comprises a reheater-condenser exchanger system in accordance with the invention.

The invention also relates to an aircraft comprising a cabin, characterized in that it comprises an air-conditioning system in accordance with the invention for supplying the cabin with conditioned air.

The invention also relates to a heat exchanger, a reheater-condenser exchanger system, an air-conditioning system and an aircraft which are characterized in combination by all or some of the features mentioned above or below.

LIST OF FIGURES

Other aims, features and advantages of the invention will become apparent upon reading the following description given solely in a non-limiting way and which makes reference to the attached figures in which.

DETAILED DESCRIPTION OF AN EMBODIMENT OF THE INVENTION

In the figures, for the purposes of illustration and clarity, scales and proportions have not been strictly respected.

Furthermore, identical, similar or analogous elements are designated by the same reference signs in all the figures.

Figure 1:
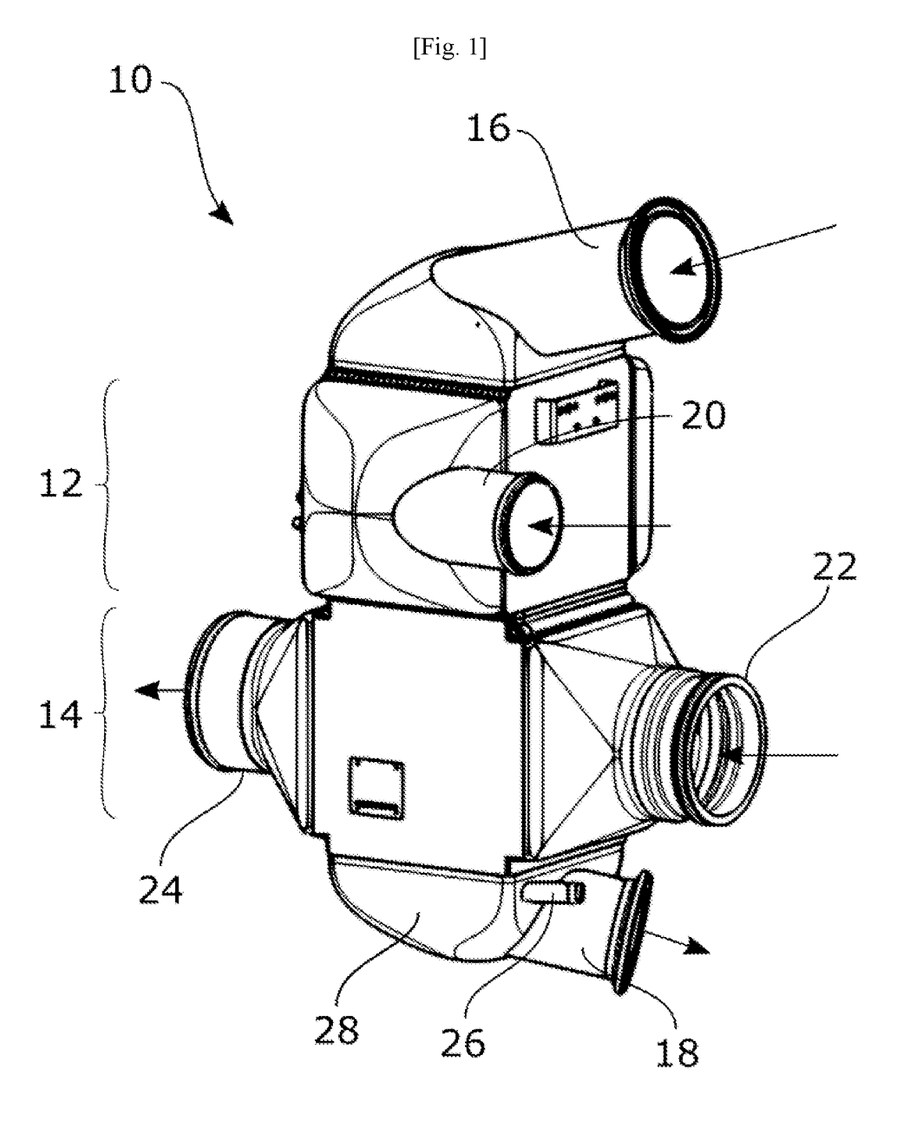
FIG. 1 is a schematic perspective view of a prior art reheater-condenser exchanger system.

FIG. 1 schematically illustrates a perspective view of a prior art reheater-condenser exchanger system 10. The exchanger system 10 comprises two exchangers, a reheater 12 and a condenser 14.

The exchanger system 10 makes possible in particular the cooling in series of a hot fluid, entering the exchanger system 10 via a hot pass inlet 16 and exiting via a hot pass outlet 18 after having successively passed through the reheater 12 and the condenser 14.

In the reheater, the hot fluid is cooled by a first cold fluid entering via a first cold pass inlet, not visible in the figure, and exiting via a first cold pass outlet 20. In the condenser, the hot fluid previously cooled by the reheater is cooled by a second cold fluid entering via a second cold pass inlet 22 and exiting via a second cold pass outlet 24.

In a conventional air-conditioning system, the second cold fluid is air coming from the outlet 18 of the cold pass, after extraction of the condensed water which it contains and after cooling and expansion via a cooling turbine of the air-conditioning system. This air forming the second cold fluid is at a temperature which can be close to 0° C., which can lead to risks of ice formation. In the prior art, icing protection is implemented by a supply of hot air to closing bars of the exchanger (which are not shown), the hot air entering via a hot air inlet 26 arranged on a distribution housing 28 at the outlet of the hot pass of the condenser 14. The presence of this hot air inlet 26 necessitates a weld in the distribution housing 28 of this hot air inlet 26 as well as a double internal wall making it possible to avoid mixing between the hot air intended for the closing bars and the hot fluid exiting the hot pass of the condenser.

Figure 2:
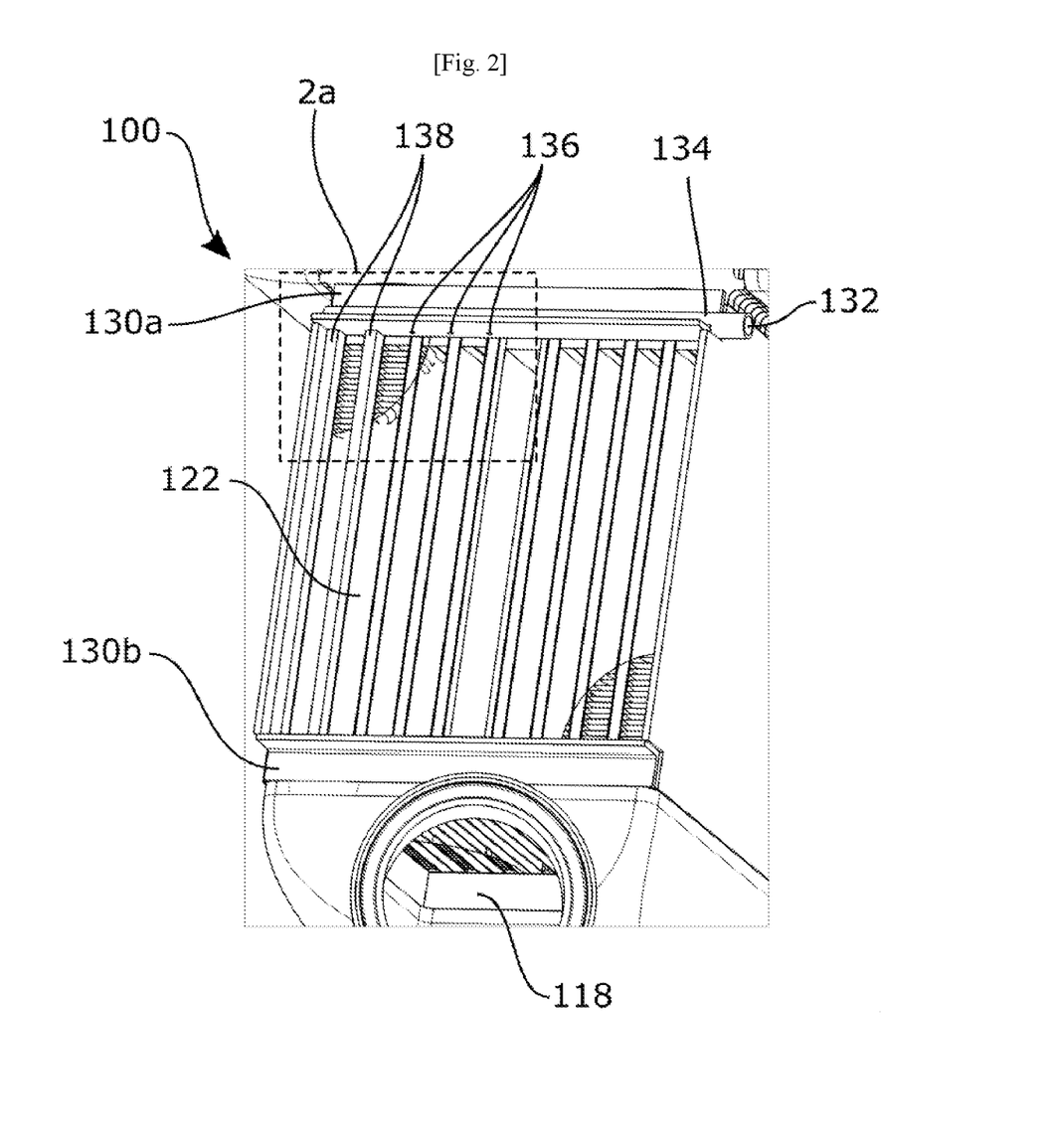
FIG. 2 is a partial schematic perspective view of a heat exchanger in accordance with a first embodiment of the invention.
Figure 2A:
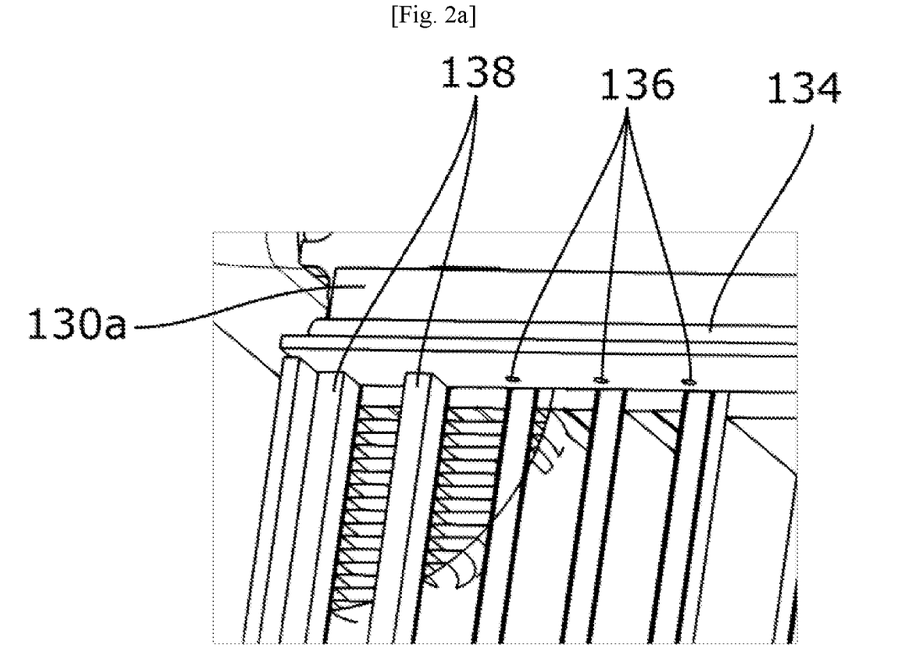
FIG. 2a is a partial schematic perspective view in close-up of a portion of the heat exchanger in accordance with the first embodiment of the invention.
Figure 3:
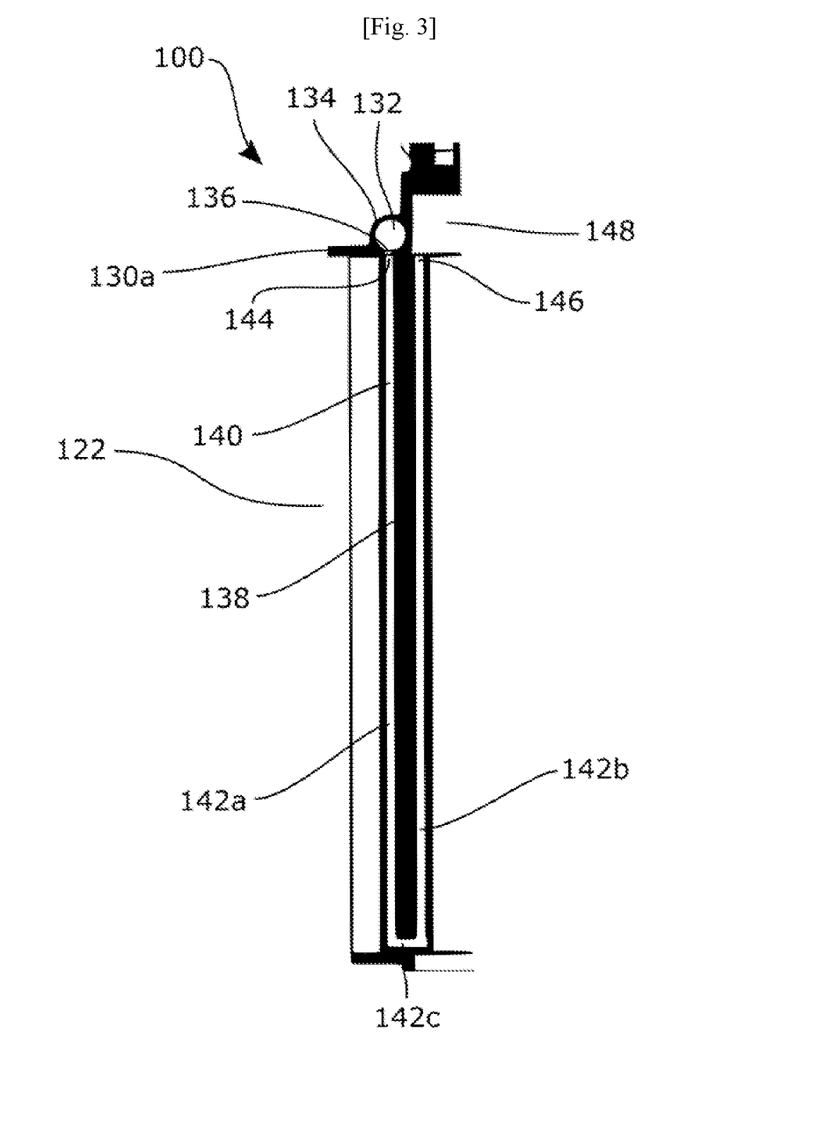
FIG. 3 is a partial schematic cross-sectional view of a heat exchanger in accordance with the first embodiment of the invention.

FIGS. 2, 2a and 3 show a heat exchanger in accordance with a first embodiment of the invention.

FIG. 2 shows a partial schematic perspective view of a heat exchanger 100 in accordance with the first embodiment of the invention. The heat exchanger 100 is e.g. a condenser of a reheater-condenser-type exchanger system. FIG. 2a shows in close-up a portion 2a of FIG. 2, defined by a dashed-line rectangle.

The exchanger 100 permits an exchange of heat between a hot fluid and a cold fluid. The hot fluid enters via a hot pass inlet (not shown), passes through the exchanger via a hot pass and exits via a hot pass outlet 118. The cold fluid enters via a cold pass inlet 122, shown in this case without the distribution housing in order to partially show the inside of the exchanger. The sealing-tightness between the hot pass and the cold pass is maintained in particular by the presence of core bands forming edges of the exchanger, in particular in this case a first core band 130a at the cold pass inlet and the hot pass inlet, and a second core band 130b at the cold pass inlet and at the hot pass outlet can be seen. The exchanger also comprises core bands, not visible, at the cold pass outlet.

The first core band 130a, at the hot pass inlet and at the cold pass inlet 122, comprises a hot air inlet 132, arranged in a cylindrical manifold 134, making it possible to supply hot air to a plurality of orifices 136 of the core band. Only three orifices 136 can be seen in this case for the purposes of illustration. At least two orifices, not visible, are located opposite closing bars 138 of the exchanger. The closing bars 138, of which two are shown in this case for the purposes of illustration, are disposed between each closing plate and define, with the closing plates, flow channels for the fluids passing through the exchanger. Even though only two of the closing bars 138 are shown, the closing bars 138 are in practice distributed over the whole width of the cold pass inlet, so as to close all the hot fluid flow channels. A pass, hot or cold, is generally made up of a plurality of flow channels alternating between hot fluid and cold fluid, so as to maximize the heat exchange between the hot fluid and the cold fluid.

The closing bars 138 which are arranged in the lengthwise direction of the cold pass make it possible to define the flow channels for the hot fluid. The cold fluid entering via the inlet 122 of the cold pass bypasses these closing bars 138 in order to flow in the flow channels for the cold fluid. These flow channels for the cold fluid are themselves defined by closing bars, not shown, extending in the lengthwise direction of the inlet and of the outlet 118 of the cold pass. Similarly, closing bars, not visible, extend in the lengthwise direction of the outlet of the cold pass.

FIG. 3 shows a partial schematic cross-sectional view of the exchanger in accordance with the first embodiment. In particular, the cross-section shows the inside of a closing bar 138

The closing bar 138 comprises a U-shaped hot air flow circuit 140 comprising a first section 142a and a second section 142b extending over the whole length of the closing bar, the first section 142a and the second section 142b being connected by an intermediate section 142c forming the base of the U.

The hot air flowing in the hot air flow circuit enters via a hot air inlet 144 opposite the orifice 136, flows in the first section 142a, then in the intermediate section 142c, then in the second section 142b, and is expelled via a hot air outlet 146 configured to expel the hot air in the hot pass at the inlet of the hot pass. The expelling of the hot air in the inlet of the hot pass permits the hot air to be cooled in passing through the cold pass, and thus not to be expelled hot at the hot pass outlet, which can lead to problems in performance.

The hot air flowing in the flow circuit thus makes it possible to avoid the formation of ice and/or to de-ice the area around the closing bars 134, in particular the area around the cold pass inlet 122, thus ensuring icing protection. In one embodiment, not shown, the closing bars comprise internal fins so as to increase the surface area for heat exchange between the hot air and the walls of the flow circuit. It is also possible for the sections of the flow circuit not to be totally straight so as to maximize the length of the circuit and the exchange surface.

According to the embodiments, some or all of the closing bars can comprise such a U-shaped circuit for the flow of hot air. If only some of the closing bars comprise a hot air circuit, these are preferably distributed over the width of the cold pass inlet in order to ensure uniform icing protection.

The manufacture of the core band and of the closing bars in accordance with the invention can be effected by molding and machining. In particular, the core band can be obtained from a core band known in the prior art, in which the orifices opposite each closing bar and to which a manifold is added by welding are pierced. The closing bars can be machined or molded so as to include the U-shaped circuit.

The core band and/or the closing bars can also be manufactured by additive manufacture, also called 3D printing, in a material compatible with the relevant function, in particular with the temperatures and mechanical stresses of a heat exchanger.

Figure 4:
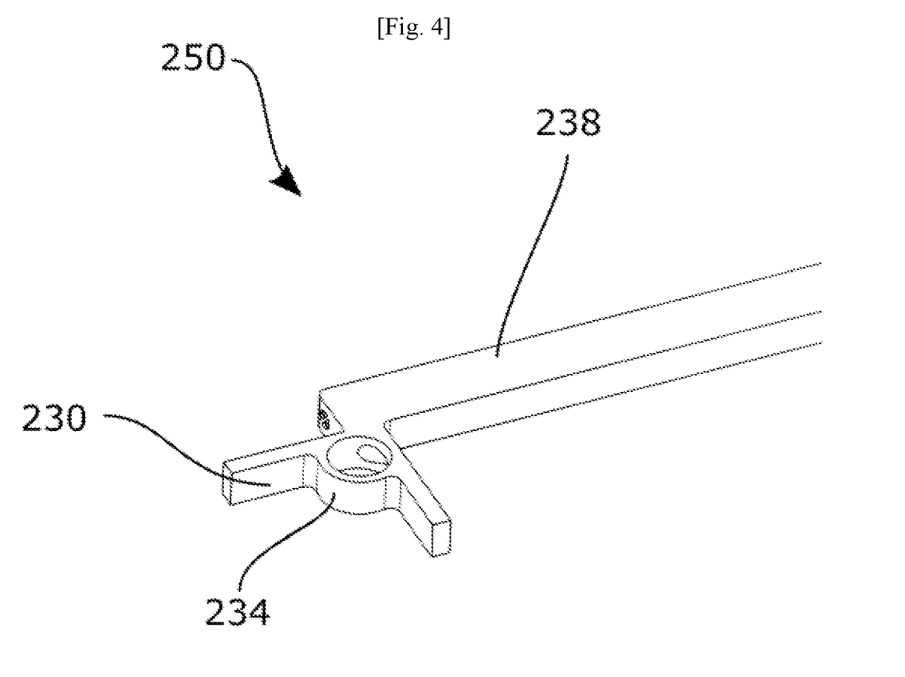
FIG. 4 is a partial schematic view of a single-piece part used in a heat exchanger in accordance with a second embodiment of the invention.

FIG. 4 shows a schematic and partial view of a single-piece part 250 forming a closing bar and a core band portion of an exchanger in accordance with a second embodiment of the invention. This part 250 is particularly suitable for additive manufacture, which makes it possible to obtain the shapes desired while reducing manufacturing stresses.

The part 250 comprises a closing bar 238 comprising a U-shaped hot air circuit (not visible), and a core band portion 230 in which a manifold portion 234 is directly integrated.

The part 250 can be integrated into a heat exchanger in accordance with a second embodiment.

Figure 5:
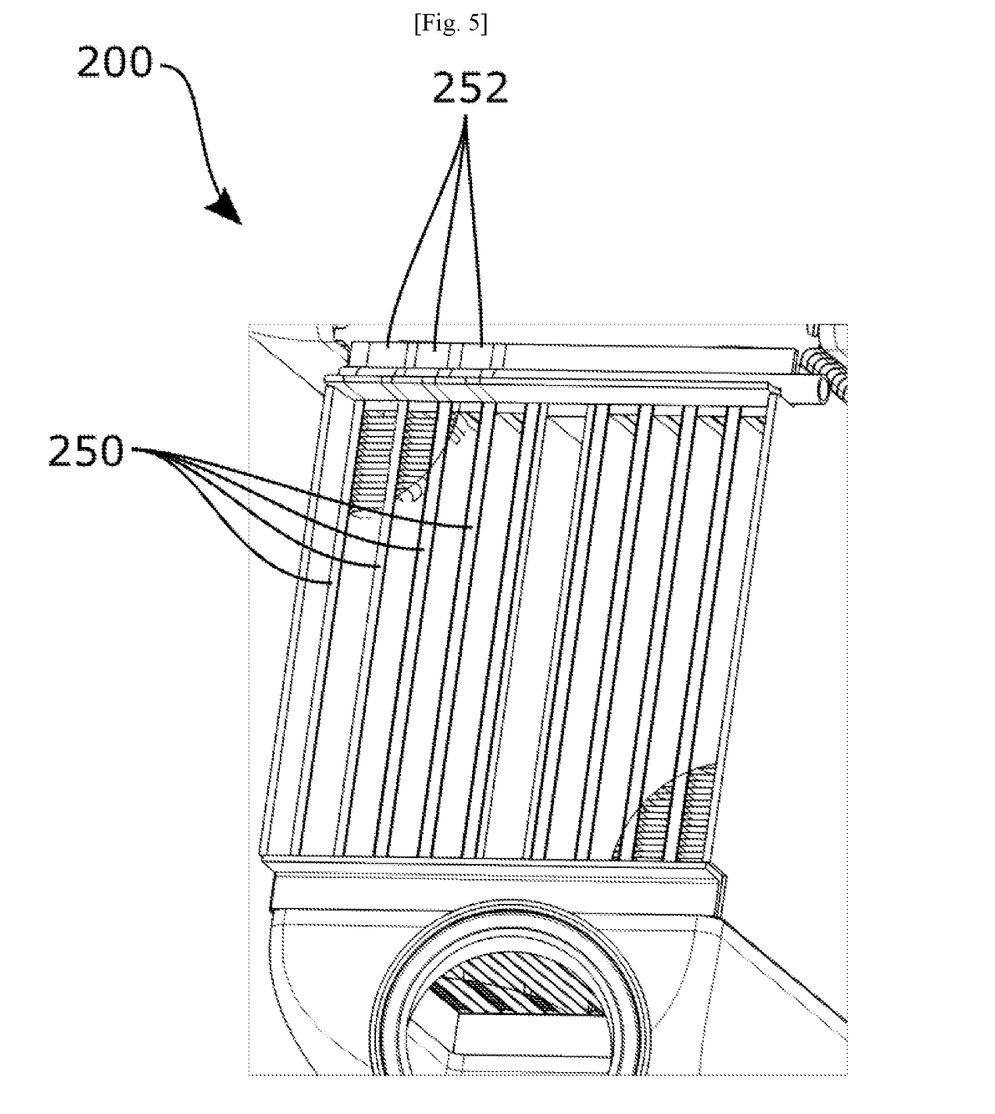
FIG. 5 is a partial schematic perspective view of a heat exchanger in accordance with the second embodiment of the invention.

FIG. 5 shows a schematic and partial perspective view of a heat exchanger 100b in accordance with the second embodiment of the invention. The view is identical to FIG. 2, and the second embodiment is similar to the first embodiment in which core band portions and the closing bars are formed from single-piece parts 250. In order to complete the core band, intermediate parts 252 comprise a portion of the core band and of the manifold and are inserted between two single-piece parts 250 forming each closing bar and core band portion.

Figure 6:
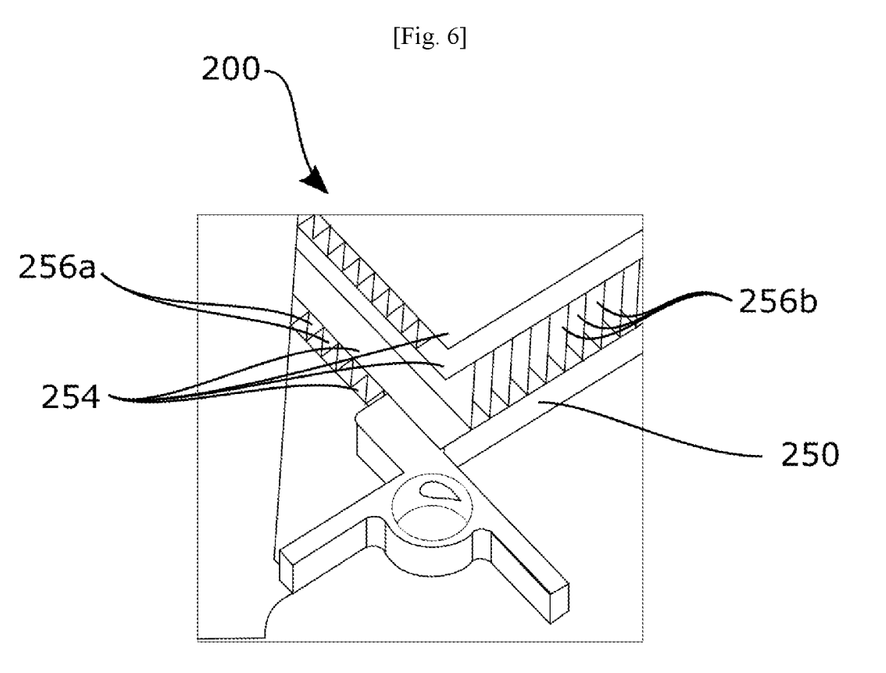
FIG. 6 is a partial schematic perspective view in close-up of a portion of the heat exchanger in accordance with the second embodiment of the invention.

FIG. 6 shows a schematic and partial perspective view in close-up of a single-piece part 250 installed in the exchanger 200 in accordance with the second embodiment of the invention. The part 250 is installed in the exchanger 200 between two closing plates 254 of the heat exchanger with plates. In this preferential embodiment, the exchanger 200 is of the plate-fin type and comprises fins 256a arranged in the hot pass and fins 256b arranged in the cold pass.

Figure 7:
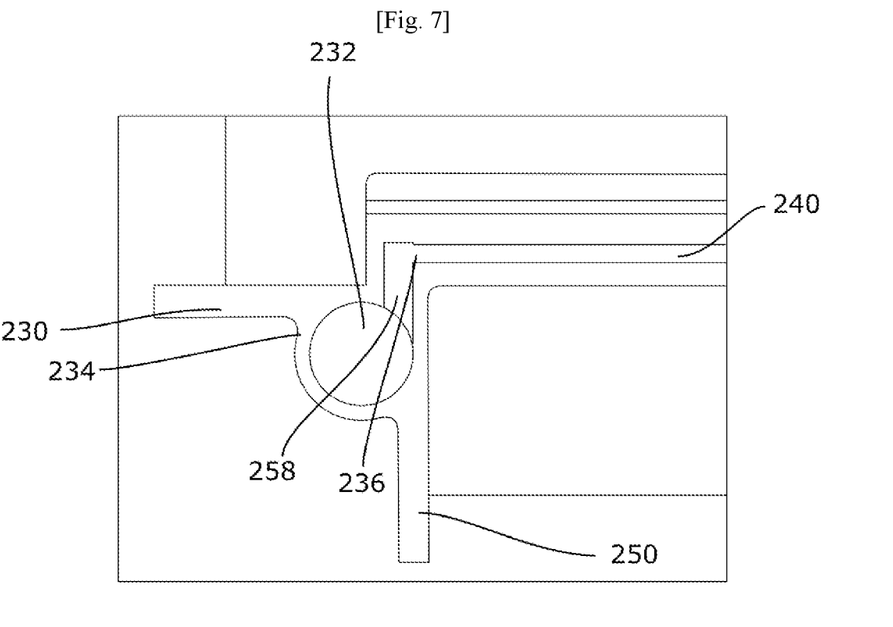
FIG. 7 is a partial schematic cross-sectional view in close-up of a portion of the heat exchanger in accordance with the second embodiment of the invention.

As seen in FIG. 7, showing a portion of the single-piece part 250 in cross-section, the hot air enters via a hot air inlet 232 and flows in the manifold 234 of the core band 230 in order to be distributed in the flow circuit 240 of each closing bar via an orifice 236. In this embodiment, the single-piece part comprises an additional section 258 provided in the core band 230 in order to feed the air to the orifice 236. In this way, as can be seen in FIG. 6, the closing bar can be more integrated between two closing plates 254 compared with the first embodiment of the exchanger.

The invention is not limited to the embodiments described above. In particular, the closing bar, the core band and the manifold can be of different shapes. As already described, the hot air flow circuits can be of shapes different from those shown in order to maximize the heat exchange and thus the icing protection while respecting the limits of pressure losses owing to the pressure of the hot air, its flow rate, its temperature, the dimensions of the flow circuit, etc.

The invention claimed is:

1. A heat exchanger with plates, which is configured for a cross flow heat exchange between a hot fluid flowing in a hot pass and a cold fluid flowing in a cold pass, the fluids flowing between closing plates, comprising:
   at least one core band arranged to form edges of the exchanger and to ensure sealing-tightness between the hot pass and the cold pass,
   a plurality of closing bars disposed between each closing plate and defining, with the closing plates, flow channels for fluids passing through the exchanger,
   wherein the core band arranged at an inlet of the cold pass and an inlet of the hot pass comprises an inlet for supplying hot air, and a plurality of orifices disposed opposite at least one closing bar of the hot pass adjoining said core band, and
   wherein at least one closing bar arranged in the lengthwise direction of the inlet of the cold pass comprises an inlet for said hot air opposite one of the orifices of the core band, and a circuit for the flow of said hot air connected to said hot air inlet,
   said flow circuit being U-shaped and comprising:
   a first section and a second section each extending over the whole length of the closing bar,
   a hot air outlet arranged at one end of the second section and configured to expel the hot air in the hot pass at the inlet of the hot pass, and
   an intermediate section forming the base of the U and connecting the first section to the second section by their end respectively opposite to the hot air inlet and to the hot air outlet.

2. The heat exchanger as claimed in claim 1, wherein at least one closing bar comprising a flow circuit is manufactured by additive manufacture.

3. The heat exchanger as claimed in claim 1, wherein the core band is manufactured by additive manufacture.

4. The heat exchanger as claimed in claim 1, wherein at least one closing bar comprising a flow circuit and at least one portion of the core band are formed of a single-piece part.

5. The heat exchanger as claimed in claim 1, wherein the core band comprises a manifold comprising the hot air inlet, extending over the length of the core band and configured to supply hot air to the flow circuit via the orifices.

6. The heat exchanger as claimed in claim 1 wherein the flow circuit comprises internal fins arranged to increase the surface area for heat exchange between the hot air and the walls of the flow circuit.

7. A reheater-condenser exchanger system comprising at least a first exchanger, referred to as a reheater, and a second exchanger, referred to as a condenser, the reheater and the condenser being arranged in series so that a hot fluid passes through the reheater then the condenser in order to be cooled, wherein the condenser is a heat exchanger with plates, which is configured for a cross flow heat exchange between a hot fluid flowing in a hot pass and a cold fluid flowing in a cold pass, the fluids flowing between closing plates, the exchanger comprising:
   at least one core band arranged to form edges of the exchanger and to ensure sealing-tightness between the hot pass and the cold pass,
   a plurality of closing bars disposed between each closing plate and defining, with the closing plates, flow channels for fluids passing through the exchanger,
   wherein the core band arranged at an inlet of the cold pass and an inlet of the hot pass comprises an inlet for supplying hot air, and a plurality of orifices disposed opposite at least one closing bar of the hot pass adjoining said core band, and wherein at least one closing bar arranged in the lengthwise direction of the inlet of the cold pass comprises an inlet for said hot air opposite one of the orifices of the core band, and a circuit for the flow of said hot air connected to said hot air inlet, said flow circuit being U-shaped and comprising:

a first section and a second section each extending over the whole length of the closing bar, a hot air outlet arranged at one end of the second section and configured to expel the hot air in the hot pass at the inlet of the hot pass, and an intermediate section forming the base of the U and connecting the first section to the second section by their end respectively opposite to the hot air inlet and to the hot air outlet.

8. An air-conditioning system of a vehicle, comprising a reheater-condenser exchanger system as claimed in claim 7.

9. An aircraft comprising:

a cabin, an air-conditioning system for supplying the cabin with conditioned air, and a reheater-condenser exchanger system of the air-conditioning system comprising at least a first exchanger, referred to as a reheater, and a second exchanger, referred to as a condenser, the reheater and the condenser being arranged in series so that a hot fluid passes through the reheater then the condenser in order to be cooled, wherein the condenser is a heat exchanger with plates, which is configured for a cross flow heat exchange between a hot fluid flowing in a hot pass and a cold fluid flowing in a cold pass, the fluids flowing between closing plates, the exchanger comprising:

at least one core band arranged to form edges of the exchanger and to ensure sealing-tightness between the hot pass and the cold pass, a plurality of closing bars disposed between each closing plate and defining, with the closing plates, flow channels for fluids passing through the exchanger, wherein the core band arranged at an inlet of the cold pass and an inlet of the hot pass comprises an inlet for supplying hot air, and a plurality of orifices disposed opposite at least one closing bar of the hot pass adjoining said core band, and wherein at least one closing bar arranged in the lengthwise direction of the inlet of the cold pass comprises an inlet for said hot air opposite one of the orifices of the core band, and a circuit for the flow of said hot air connected to said hot air inlet, said flow circuit being U-shaped and comprising:

a first section and a second section each extending over the whole length of the closing bar, a hot air outlet arranged at one end of the second section and configured to expel the hot air in the hot pass at the inlet of the hot pass, and an intermediate section forming the base of the U and connecting the first section to the second section by their end respectively opposite to the hot air inlet and to the hot air outlet.

* * * * *